United States Patent
Ito et al.

(10) Patent No.: US 9,028,941 B2
(45) Date of Patent: May 12, 2015

(54) SHEET FOR PRODUCING MULTILAYER OPTICAL RECORDING MEDIUM, MULTILAYER OPTICAL RECORDING MEDIUM, AND ADHESIVE

(71) Applicant: Lintec Corporation, Tokyo (JP)

(72) Inventors: Masaharu Ito, Tokyo (JP); Seitaro Yamaguchi, Tokyo (JP); Yuichi Kozone, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 14/019,597

(22) Filed: Sep. 6, 2013

(65) Prior Publication Data

US 2014/0087114 A1   Mar. 27, 2014

(30) Foreign Application Priority Data

Sep. 25, 2012 (JP) ................. 2012-210661
Sep. 25, 2012 (JP) ................. 2012-210662

(51) Int. Cl.
  *G11B 7/24* (2013.01)
  *G11B 7/24024* (2013.01)
  *G11B 7/256* (2006.01)

(52) U.S. Cl.
  CPC ............ *G11B 7/24024* (2013.01); *G11B 7/256* (2013.01)

(58) Field of Classification Search
  CPC ...... G11B 7/24; G11B 7/24024; G11B 7/252; G11B 7/256; G11B 7/2403
  USPC ....................... 428/64.1, 64.4, 65.1
  See application file for complete search history.

(56) References Cited

U.S. PATENT DOCUMENTS

2010/0143638 A1*  6/2010  Nakabayashi ............... 428/65.1

FOREIGN PATENT DOCUMENTS

| JP | 63069045 A | * | 3/1988 |
|---|---|---|---|
| JP | 11-250496 A |  | 9/1999 |
| JP | 2000-067464 A |  | 3/2000 |
| JP | 2005-209328 A |  | 8/2005 |
| JP | 2012-089195 A |  | 5/2012 |

* cited by examiner

*Primary Examiner* — Elizabeth Mulvaney
(74) *Attorney, Agent, or Firm* — Posz Law Group, PLC

(57) ABSTRACT

A sheet for producing a multilayer optical recording medium comprises optical recording layers and adhesive layers laminated on one another, wherein the adhesive layer comprises an adhesive comprising a polymer as a main component, the polymer includes fluorine-containing monomer and/or silicon-containing monomer as a constituent monomer component, the adhesive layer has no domain structure or has a domain structure of 110 nm or less, a total content of the fluorine-containing monomer and the silicon-containing monomer is 10 to 100 mass % when a monomer total amount as the constituent monomer component in the polymer is 100 mass %. According to the sheet for producing a multilayer optical recording medium, a multilayer optical recording medium can be produced which can detect reflected light having sufficient intensity from the interface between the optical recording layer and the adhesive layer and which generates less scattered light in the adhesive layer and causes less noise.

14 Claims, 3 Drawing Sheets

SHEET FOR PRODUCING MULTILAYER OPTICAL RECORDING MEDIUM, MULTILAYER OPTICAL RECORDING MEDIUM, AND ADHESIVE

CROSS REFERENCE TO RELATED APPLICATIONS

This application is based on and incorporates herein by reference Japanese Patent Application No. 2012-210661 filed on Sep. 25, 2012 and Japanese Patent Application No. 2012-210662 filed on Sep. 25, 2012.

TECHNICAL FIELD

The present invention relates to a multilayer optical recording medium comprising optical recording layers and adhesive layers laminated on one another, and also to a sheet for producing a multilayer optical recording medium and an adhesive which are useful for producing the multilayer optical recording medium.

BACKGROUND ART

In recent years, for the purpose of densely recording information to an optical recording medium, a multilayer optical recording medium utilizing a multi-photon absorption material is proposed. To decrease crosstalk in the multilayer optical recording medium, it is proposed a structure in which one or more optical non-recording layers are interposed between optical recording layers (refer to Patent Literatures 1 and 2, for example). In the multilayer optical recording medium having such a structure, a method is contemplated in which recording light is irradiated to deform the shape of an optical recording layer so that the optical recording layer forms convex structures into an intermediate layer thereby to record information to the optical recording layer (refer to Patent Literature 3).

To produce a multilayer optical recording medium having the structure as the above, a method of forming each layer using spin-coat method and laminating layers may be used. However, this method involves problems such as that the multilayer optical recording medium is difficult to have a large surface area and materials are restricted.

To solve the problem above, it is proposed a production method of a multilayer optical recording medium using a pressure sensitive adhesive sheet comprising an optical recording layer including photosensitive material and an adhesive layer disposed thereon. (refer to Patent Literature 4). According to the production method using the pressure-sensitive adhesive sheets, a multilayer optical recording medium can easily be produced to have a large surface area.

PRIOR ART LITERATURE

Patent Literature

[Patent Literature 1] JP11-250496A
[Patent Literature 2] JP2000-67464A
[Patent Literature 3] JP2012-89195A
[Patent Literature 4] JP2005-209328A

SUMMARY OF THE INVENTION

Problems to be Solved by the Invention

In the prior art multilayer optical recording medium, a reflective layer may be provided such as by sputtering thereby to perform detection of each layer utilizing reflected light from an interface of the reflective layer. Recently, in a multilayer optical recording medium as the above, it is contemplated to utilize reflected light from an interface between the optical recording layer and the adhesive layer to detect the interface of each layer thereby reading information from the optical recording layer.

In the case of utilizing reflected light from the interface between the optical recording layer and the adhesive layer in such a manner, reflected light having a lower intensity may have to be detected compared to the case of providing a reflective layer. Conventional adhesive layer has a relatively high refractive index so that the refractive index difference from that of the optical recording layer is small, and reflected light having an intensity necessary for detection may be difficult to be obtained, thus being problematic. In addition, scattered light may increase depending on the phase separating state of the adhesive layer, and the scattered light may generate noise at the time of detecting the reflected light to cause failure in detecting the reflected light.

The present invention has been made in consideration of such circumstances, and objects of the present invention include providing a multilayer optical recording medium which can detect reflected light having sufficient intensity from the interface between an optical recording layer and an adhesive layer and which generates less scattered light in the adhesive layer and causes less noise, and also providing a sheet for producing a multilayer optical recording medium and an adhesive which are able to be used for producing the multilayer optical recording medium.

Means for Solving the Problems

To achieve the above objects, first, the present invention provides a sheet for producing a multilayer optical recording medium comprising optical recording layers and adhesive layers laminated on one another, the sheet comprising an optical recording layer and an adhesive layer laminated on each other, the adhesive layer being configured of an adhesive comprising a polymer as a main component, the polymer including fluorine-containing monomer and/or silicon-containing monomer as a constituent monomer component, the adhesive layer having no domain structure or having a domain structure with a size of domain of 110 nm or less, wherein a total content of the fluorine-containing monomer and the silicon-containing monomer is 10 to 100 mass % when a monomer total amount as the constituent monomer component in the polymer is 100 mass % (Invention 1).

The adhesive layer in the above invention (Invention 1) has a low refractive index and the refractive index difference from that of the optical recording layer is large, so that reflected light having sufficient intensity necessary for detection can be obtained from the interface between the optical recording layer and the adhesive layer. The adhesive layer in the above invention (Invention 1) generates less scattered light thereby to cause less noise at the time of detecting reflected light from the interface between the optical recording layer and the adhesive layer, and failure in detecting the reflected light can thus be suppressed from occurring.

In the above invention (Invention 1), it is preferred that the fluorine-containing monomer is fluorine-containing acrylic monomer, and the silicon-containing monomer is silicon-containing acrylic monomer (Invention 2).

In the above inventions (Inventions 1, 2), it is preferred that the polymer contains, as the constituent monomer component, acrylic monomer having a functional group (Invention 3).

In the above inventions (Inventions 1-3), it is preferred that the polymer is crosslinked by a crosslinking agent (Invention 4).

In the above invention (Invention 4), it is preferred that the crosslinking agent is at least one type selected from a group consisting of metal-based crosslinking agent, epoxy-based crosslinking agent, and aziridine-based crosslinking agent (Invention 5).

In the above inventions (Inventions 1-5), it is preferred that the adhesive layer has a refractive index of 1.45 or less (Invention 6).

In the above inventions (Inventions 1-6), it is preferred that the optical recording layer contains a photon absorption material (Invention 7).

Second, the present invention provides a multilayer optical recording medium obtained using the sheet for producing a multilayer optical recording medium (Inventions 1-7) (Invention 8).

Third, the present invention provides a multilayer optical recording medium comprising optical recording layers and adhesive layers laminated on one another, wherein the adhesive layers comprise an adhesive comprising a polymer as a main component, the polymer includes fluorine-containing monomer and/or silicon-containing monomer as a constituent monomer component, the adhesive layers have no domain structure or have a domain structure with a size of domain of 110 nm or less, and a total content of the fluorine-containing monomer and the silicon-containing monomer is 10 to 100 mass % when a monomer total amount as the constituent monomer component in the polymer is 100 mass % (Invention 9).

The multilayer optical recording medium according to the above inventions (Inventions 8, 9) may be such that, when recording light is irradiated to the multilayer optical recording medium, a convex portion is formed on any of the optical recording layers at an interface between the optical recording layers and the adhesive layers, and a concave portion is formed on the adhesive layer contacting with a portion formed thereon with the convex portion (Invention 10).

Fourth, the present invention provides an adhesive comprising a polymer as a main component, wherein the polymer includes fluorine-containing monomer and/or silicon-containing monomer as a constituent monomer component, a total content of the fluorine-containing monomer and the silicon-containing monomer is 10 to 100 mass % when a monomer total amount as the constituent monomer component in the polymer is 100 mass %, the adhesive has no domain structure or has a domain structure with a size of domain of 110 nm or less, and a refractive index is 1.45 or less when the adhesive is formed into an adhesive layer having a thickness of 10 μm (Invention 11).

Advantageous Effect of the Invention

The present invention provides a multilayer optical recording medium which may detect reflected light of sufficient intensity at the interface between the optical recording layer and the adhesive layer, and have less noise in detecting the reflected right due to less scattering light in the adhesive layer.

EMBODIMENTS FOR CARRYING OUT THE INVENTION

Embodiments of the present invention will hereinafter be described.

In the multilayer optical recording medium provided according to the present embodiment, recording is performed by utilizing photon absorption in a recording material. Photon absorption is a phenomenon that a chemical compound absorbs photons thereby to be excited.

<Sheet for Producing Optical Recording Medium>

Figure 1:
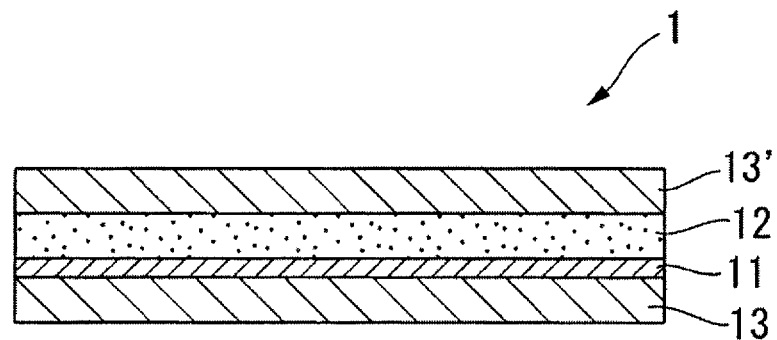
FIG. 1 is a cross-sectional view of a sheet for producing a multilayer optical recording medium according to one embodiment of the present invention.

FIG. 1 is a cross-sectional view of a sheet for producing a multilayer optical recording medium according to one embodiment of the present invention. Sheet 1 for producing a multilayer optical recording medium according to the present embodiment may comprise an optical recording layer 11, an adhesive layer 12 laminated on the optical recording layer 11, a release sheet 13 laminated on the outer surface of the optical recording layer 11, and a release sheet 13' laminated on the outer surface of the adhesive layer 12. The release sheets 13 and 13' are to be released when the sheet 1 for producing a multilayer optical recording medium is used. The release sheet 13 or the release sheet 13' in the sheet 1 for producing a multilayer optical recording medium may be omitted.

<Optical Recording Layer>

A recording material (optical recording material) that constitutes the optical recording layer 11 may be one including a photon absorption material, and the material to be used may be appropriately selected from any of materials known as constituent materials for an optical recording layer in the conventional optical recording medium. Examples of the photon absorption material include a single-photon absorption material and a multi-photon absorption material. The multi-photon absorption material includes a chemical compound that has properties of simultaneously absorbing two or more photons and transitioning to an excited state. The multi-photon absorption material is such that the photon absorption occurs only at locations where the light intensity is high, so that the spatial resolution may be enhanced and recording can be enabled to be targeted on one point in the optical recording medium. In view of obtaining sufficient recording sensitivity for practical use, it may be preferred that the optical recording layer 11 contains multi-photon absorption materials, among which preferred is a two-photon absorption material having a two-photon absorption cross-section of 0.1 GM or more, and particularly preferred is a two-photon absorption material of 100 GM or more. The unit "GM" represents $10^{-50}$ $cm^4 \cdot s \cdot molecule^{-1} \cdot photon^{-1}$.

Examples of the optical recording material as described above include: a material configured solely of a photon absorption material; a material configured of a photon absorption material and other reactive chemical compound that is caused to change due to energy transfer from an excited photon absorption material; and a material in which the above materials are compounded in matrix as necessary.

Material that constitutes the above matrix may be any of inorganic or organic material, but among which organic polymer material is preferable with consideration for simplicity in producing the sheet 1 for producing a multilayer optical recording medium, variety in options of material, and other factors. The polymer may be any of homopolymer or copolymer, and the type, molecular weight and polymerization form thereof etc. are not particularly restricted.

Specific examples of the above polymer material include: various types of polyethylene; ethylene/1-butene copolymer; ethylene/4-methyl-1-pentene copolymer; ethylene/1-hexene copolymer; polypropylene; ethylene/propylene copolymer; propylene/1-butene copolymer; poly1-butene; 1-butene/4-methyl-1-pentene copolymer; poly4-methyl-1-pentene; poly3-methyl-1-butene; ethylene/cyclic olefin copolymer; polyolefin series such as cyclic olefin-based resin; ethylene/vinyl acetate copolymer; ethylene/acrylic acid copolymer or metal salt thereof; poly(meth)acrylate such as polymethylmethacrylate and alicyclic acrylic resin; polyester-based resin such as polyethylene terephthalate and polyethylene naphthalate; fluorine-based resin such as polyperfluoroethylene and perfluoroalkenyl vinyl ether polymer; polystyrene; polyvinyl alcohol; polycarbonate; polyphenylene sulfide; polyether sulfone; polyimide; polyphenylene oxide; olefin/N-substituted maleimide copolymer; allyl carbonate resin; epoxy acrylate resin; and urethane acrylate resin. One type of these polymer materials may be solely used, or two or more types may be used in combination. In this description, (meth)acrylate represents both acrylate and methacrylate. The same applies to other similar terms.

The photon absorption material may be one that is chemically bonded as a main chain or side chain component to the above matrix, or one that is merely dispersed or dissolved in the matrix. The photon absorption material is not particularly restricted, and various chemical compounds may be used. Examples of the photon absorption material include cyanine dye, styryl dye, pyrylium dye, thiapyrylium dye, merocyanine dye, arylidene dye, oxonol dye, squalium (squarylium) dye, azulenium dye, coumarin dye, pyran dye, quinone dye, anthraquinone dye, triphenylmethane dye, diphenylmethane dye, xanthene dye, thioxanthene dye, phenothiazine dye, azo dye, azomethine dye, fluorenone dye, diarylethene dye, spiropyran dye, fulgide dye, perylene dye, polyene dye, diphenylamine dye, quinacridone dye, azulenium dye, porphyrin dye, phthalocyanine dye, styrene-based dye, phenylenevinylene dye, triphenylamine-based dye, and carbazole-based dye.

The molecular weight of the above photon absorption material is not particularly restricted, but may preferably be 600 or more. If the molecular weight is 600 or more, then the photon absorption material can be suppressed from transferring to the adhesive layer 12. The upper limit of the molecular weight is not particularly restricted, but may ordinarily be about 100,000 as a number average molecular weight Mn. The photon absorption material having such a high molecular weight can be obtained by chemically bonding it as a main chain or side chain component to the previously-described matrix. The above number average molecular weight Mn may be a converted value in terms of standard polystyrene measured by using gel permeation chromatography method (GPC method).

Examples of a method of recording using the photon absorption material as the above include: a method of reading refractive index modulation such as by using a material, such as azo group, C=C group or C=N group-containing chemical compound, which is isomerized by light, using a material, such as (meth)acrylate chemical compound, which causes polymerization reaction by light, using a material, such as organic photochromic material, which causes reversible structural change by light, or using an organic refractive material which causes an electric charge distribution by light; a method of reading fluorescence by using a material which changes in fluorescence characteristic by light; and a method of reading absorptance modulation and/or refractive index modulation by using a combination of a material that generates acid by light and an acid-chromogenic dye or a combination of a decolorant and a decoloring dye. In these recording methods, the photon absorption material in itself may cause structural change or react due to photon absorption, or the photon absorption material may be excited due to photon absorption, from which the excited energy obtained by photon absorption may transfer to other chemical compounds thereby to cause structural change and/or reaction.

The thickness of the optical recording layer 11 is not particularly restricted, but may be ordinarily about 0.04 to 50 µm, and preferably 0.05 to 10 µm.

<Adhesive Layer>

The adhesive layer 12 comprises an adhesive that comprises a polymer as a main component, wherein the polymer includes fluorine-containing monomer and/or silicon-containing monomer as constituent monomer components, and the adhesive layer 12 has no domain structure or has a domain structure with a size of domain of 110 nm or less. The total content of the fluorine-containing monomer and the silicon-containing monomer as the constituent monomer components in the above polymer is 10 to 100 mass % when the monomer component total amount is 100 mass %. The above adhesive may be a pressure-sensitive adhesive or a non-pressure-sensitive adhesive, but may preferably be a pressure-sensitive adhesive in view of simplicity in using the sheet 1 for producing a multilayer optical recording medium.

The adhesive layer 12 comprising the material and the structure as described above has a low refractive index and the refractive index difference from that of the optical recording layer 11 is large, so that reflected light having sufficient intensity necessary for detection can be obtained from the interface between the optical recording layer 11 and the adhesive layer 12. The adhesive layer 12 comprising the material and the structure as described above generates less scattered light thereby to cause less noise at the time of detecting reflected light from the interface between the optical recording layer 11 and the adhesive layer 12, and failure in detecting the reflected light can thus be suppressed from occurring.

The domain as used herein refers to a particle-like or island-like resin component that can be viewed when a phase image is observed using dynamic force mode (DFM) of a scanning probe microscope (SPM). The term of "having no domain structure" means a state where no domain exists in the adhesive layer and the whole is uniform. The term "size of domain" represents the size of a domain, i.e., a particle-like or island-like resin component, which exists in the adhesive layer, and refers to the maximum length of the particle-like or island-like resin component. Specifically, an average value of the maximum lengths of 30 domains is referred to as the "size of domain". The adhesive layer 12 has no domain structure or has a domain structure with a size of domain of 110 nm or less, thereby to reduce scattered light in the adhesive layer 12 and at the interface. The size of domain in the adhesive layer 12 according to the present embodiment may be 110 nm or less, preferably 80 nm or less, and particularly preferably 50 nm or less, for the purpose of reducing scattered light by sufficiently reducing the size of domain in the adhesive layer 12 relative to the wavelength of light used to perform recording/reproducing for the optical recording layer 11.

The fluorine-containing monomer may be, but not limited to, a chemical compound having one or more polymerizable unsaturated groups and fluorine atoms in a molecule, such as those having (meth)acryloyl group, vinyl group, epoxy group or other appropriate group at either end or at each of both ends, among which a chemical compound having (meth) acryloyl group at either end may be preferable. Examples of such fluorine-containing monomer include fluorine-containing acrylic monomer, tetrafluoroethylene, hexafluoropropylene, chlorofluoroethylene, vinylidene fluoride, vinyl fluoride, and perfluoroalkyl vinyl ether, among which fluorine-containing acrylic monomer may be preferable.

The fluorine-containing acrylic monomer is not limited so long as being acrylic monomer that includes one or more fluorine atoms, and fluoro(meth)acrylate may be mentioned, for example, which has a fluoroalkyl group of a carbon number of 2 to 20 obtained by substituting fluorine atoms for a part or whole of hydrogen atoms in the alkyl group. Examples of such fluorine-containing acrylic monomer include 2,2,2-trifluoroethyl(meth)acrylate, 1,1,1,3,3,3-hexafluoroisopropyl (meth)acrylate, 2,2,3,3-tetrafluoropropyl(meth)acrylate, 2,2, 3,3,3-pentafluoropropyl(meth)acrylate, 1,2,2,2-tetrafluoro-1-(trifluoromethyl)ethyl(meth)acrylate, 2,2,3,3,4,4,4-heptafluorobutyl(meth)acrylate, 3,3,4,4,5,5,6,6,7,7,8,8,8-tridecafluorooctyl(meth)acrylate, 2-(perfluorobutyl)ethyl (meth)acrylate, 2-(perfluorohexyl)ethyl(meth)acrylate, 3-(perfluorobutyl)-2-hydroxypropyl(meth)acrylate, 3-perfluorohexyl-2-hydroxypropyl(meth)acrylate, 3-(perfluoro-3-methylbutyl)-2-hydroxypropyl(meth)acrylate, 1H,1H,3H-tetrafluoropropyl(meth)acrylate, 1H,1H,3H-hexafluorobutyl (meth)acrylate, 1H,1H,5H-octafluoropentyl(meth)acrylate, 1H,1H,7H-dodecafluoroheptyl(meth)acrylate, and 1H-1-(trifluoromethyl)trifluoroethyl(meth)acrylate. These fluorine-containing acrylic monomers may be solely used, or two or more types may be used in combination.

The silicon-containing monomer may be, but not limited to, a siloxane-based chemical compound having one or more polymerizable unsaturated groups in a molecule, such as those having (meth)acryloyl group, vinyl group, epoxy group or other appropriate group at either end or at each of both ends. Examples of such monomer include silicon-containing acrylic monomer.

As the silicon-containing acrylic monomer, (meth)acrylate may preferably be used which has a silicon atom-containing group at a side chain and has an alkyl group of a carbon number of 2 to 20.

Examples of the silicon-containing acrylic monomer include 2-(trimethylsilyloxy)ethyl(meth)acrylate and 3-[tris (trimethylsilyloxy)silyl]propyl(meth)acrylate. Examples of a specific product of the silicon-containing acrylic monomer include Silaplane FM series and TM series (product name) available from Chisso Corporation (e.g. FM-7711, FM7721, FM7731, FM-0711, FM-0721, FM-0725, TM0701, and TM0701T). These silicon-containing acrylic monomers may be solely used, or two or more types may be used in combination.

The above polymer includes a certain amount of the fluorine-containing monomer and/or the silicon-containing monomer thereby to reduce the refractive index of the adhesive layer 12, and reflected light having sufficient intensity necessary for detection can thus be obtained from the interface between the optical recording layer 11 and the adhesive layer 12.

It may be preferred that the polymer includes, as a constituent monomer, an acrylic monomer having a functional group capable of forming a crosslinked structure in addition to the above fluorine-containing monomer and/or silicon-containing monomer. The acrylic monomer having such a functional group may react with a crosslinking agent as will be described later to be bonded, forming a crosslinked structure, so that the cohesive force of the adhesive layer may be enhanced and the adhesive layer can be prevented from exuding.

The content of the acrylic monomer having a functional group capable of forming a crosslinked structure in the polymer may be preferably 0.1 to 10 mass %, and more preferably 0.1 to 5 mass %, when the monomer component total amount is 100 mass %.

The functional group capable of forming a crosslinked structure may varies depending on the type of the crosslinking agent to be used, but carboxyl group, hydroxyl group, amino group and amide group may ordinarily be mentioned. Among them, carboxyl group and hydroxyl group may be preferable in consideration of excellent adhesiveness with the optical recording layer.

Examples of acrylic monomer having the above functional group include: hydroxyalkyl(meth)acrylate, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl (meth)acrylate; monoalkylaminoalkyl(meth)acrylate, such as monomethylaminoethyl(meth)acrylate, monoethylaminoethyl(meth)acrylate, monomethylaminopropyl(meth)acrylate and monoethylaminopropyl(meth)acrylate; and ethylenic unsaturated carboxylic acid, such as acrylic acid, methacrylic acid, crotonic acid, maleic acid, itaconic acid, citraconic acid and succinic acid.

Among them, as the acrylic monomer having the functional group, ethylenic unsaturated carboxylic acid, such as acrylic acid, methacrylic acid, crotonic acid, maleic acid, itaconic acid, citraconic acid and succinic acid, may be preferable in view of the uniformity of polymerization. These may be solely used or two or more types may be used in combination.

The polymer may contain, if desired, as a constitutional element, (meth)acrylic acid ester that does not have any functional group capable of forming a crosslinked structure in addition to the above fluorine-containing monomer and/or silicon-containing monomer.

As the (meth)acrylic acid ester that does not have any functional group capable of forming a crosslinked structure, (meth)acrylic acid alkyl ester may be preferable, of which the carbon number of the alkyl group is 1 to 20. Examples of (meth)acrylic acid alkyl ester of which the carbon number of the alkyl group is 1 to 20 include methyl(meth)acrylate, ethyl (meth)acrylate, propyl(meth)acrylate, isopropyl(meth)acrylate, n-butyl(meth)acrylate, isobutyl(meth)acrylate, t-butyl (meth)acrylate, pentyl(meth)acrylate, hexyl(meth)acrylate, cyclohexyl(meth)acrylate, 2-ethylhexyl(meth)acrylate, isooctyl(meth)acrylate, decyl(meth)acrylate, dodecyl(meth) acrylate, myristyl(meth)acrylate, palmityl(meth)acrylate, stearyl(meth)acrylate, ethoxy-diethylene glycol acrylate, isoamyl acrylate, methoxy-triethylene glycol acrylate, 2-ethylhexyl-diglycol acrylate, methoxy-polyethylene glycol acrylate, and methoxydipropylene glycol acrylate. Among them, (meth)acrylic acid alkyl ester of which the carbon number of the alkyl group is 4 to 20 may be more preferable. These may be solely used or two or more types may be used in combination.

The polymer may contain other monomers as necessary, and examples thereof include: vinyl esters, such as vinyl acetate and vinyl propionate; olefins, such as ethylene, propylene and isobutylene; halogenated olefins, such as vinyl chloride and vinylidene chloride; styrene-based monomers, such as styrene and α-methylstyrene; diene-based monomers, such as butadiene, isoprene and chloroprene; nitrile-based monomers, such as acrylonitrile and methacrylonitrile;

and acrylamides, such as acrylamide, N-methylacrylamide and N,N-dimethylacrylamide, which may be solely used or two or more types may be used in combination.

The total content of the fluorine-containing monomer and the silicon-containing monomer as the constituent monomer components in the above polymer is 10 to 100 mass % when the monomer component total amount is 100 mass %. If the total content of the fluorine-containing monomer and the silicon-containing monomer is less than 10 mass %, then it may possibly be difficult to reduce the refractive index of the adhesive layer 12 obtained as will be described later. In view of reducing the refractive index, the total content of the fluorine-containing monomer and the silicon-containing monomer may be preferably 55 to 99.9 mass %, more preferably 60 to 99 mass %, and most preferably 80 to 95 mass %.

In the case of using other monomers (including (meth) acrylic acid ester that does not have any functional group capable of forming a crosslinked structure) as necessary, it may be preferred that the content of the other monomers in the above polymer is 0.1 to 90 mass %. Using the other monomers allows the adhesive obtained to be easily designed to have a desired pressure-sensitive adhesion property.

The polymerization form of the above polymer may be, but not particularly restricted, any of random, block and graft copolymers. The molecular weight of the polymer may be preferably within a range of 10,000 to 2,000,000 as a weight-average molecular weight (Mw), more preferably within a range of 50,000 to 1,000,000, and most preferably within a range of 100,000 to 800,000. The above weight-average molecular weight (Mw) may be a converted value in terms of standard polystyrene measured by using gel permeation chromatography (GPC) method.

The above polymer can be prepared by polymerizing a mixture of the above monomer components using a conventional method (such as emulsion polymerization method, solution polymerization method, suspension polymerization method, bulk polymerization method, and aqueous solution polymerization method). Among them, solution polymerization method to be performed in organic solvent may preferably be employed to produce the polymer in view of the stability during polymerization and the usability in use.

For example, after being dissolved in organic solvent, the mixture of the monomer components may be subjected to radical polymerization by adding thereto azo-based polymerization starter, such as conventionally known azobisisobutyronitrile and 2-2'azobis(2-aminodipropane)dihydrochloride, or peroxide-based polymerization starter, such as benzoylperoxide, to produce the above polymer.

The amount of the polymerization starter may be preferably within a range of 0.01 to 5 parts by mass relative to 100 parts by mass of the mixture of the monomer components, and particularly preferably within a range of 0.1 to 1 parts by mass.

The radical polymerization may be performed by heating them ordinarily at about 10° C. to 100° C., preferably at about 50° C. to 90° C., for about 1 to 20 hours, preferably for about 3 to 10 hours, and organic solvent solution of the above polymer can thereby be obtained.

One type of the above polymer may be solely used, or two or more types may be used in combination.

It may be preferred that the above polymer is crosslinked by a crosslinking agent. This allows the obtained adhesive to have a high cohesive force, which may be preferable as the adhesive layer 12 in the sheet 1 for producing a multilayer optical recording medium.

The crosslinking agent may be selected from commonly-used ones, such as metal-based crosslinking agent, epoxy-based crosslinking agent, aziridine-based crosslinking agent and isocyanato-based crosslinking agent, among which preferred is at least one type selected from a group consisting of metal-based crosslinking agent, epoxy-based crosslinking agent, and aziridine-based crosslinking agent. The crosslinking agent may be solely used, or two or more types may be used in combination. The fluorine-containing monomer and the silicon-containing monomer in the above polymer may have a low polarity so that the above polymer may also have a low polarity, and hence, the compatibility of the above polymer and the crosslinking agent may be poor in general, and a domain structure is likely to be generated in the obtained adhesive layer. However, the use of the above preferable crosslinking agent allows the compatibility of the above polymer and the crosslinking agent to be enhanced thereby making domains small in the domain structure in the obtained adhesive layer, resulting in less scattered light.

Examples of the metal-based crosslinking agent include metal chelate compound, metal alkoxide and metal salt or chloride, among which metal chelate compound is preferable. The metal chelate compound is not particularly restricted, but may appropriately be selected from any of chemical compounds known as metal chelate-based compounds to be used in acrylic pressure-sensitive adhesive. The metal chelate-based compounds may be ones in which the metal atom is aluminum, zirconium, titanium, zinc, iron, tin or the like, but in view of easily controlling the reactivity, such as setting of the pot life of the application liquid, aluminum chelate compound is preferable.

Examples of aluminum chelate compound include diisopropoxy aluminum monooleyl acetoacetate, monoisopropoxy aluminum bisoleyl acetoacetate, monoisopropoxy aluminum monooleate monoethyl acetoacetate, diisopropoxy aluminum monolauryl acetoacetate, diisopropoxy aluminum monostearyl acetoacetate, diisopropoxy aluminum monoisostearyl acetoacetate, monoisopropoxy aluminum mono-N-lauroyl-β-alanate monolauryl acetoacetate, aluminum trisacetylacetonate, monoacetylacetonato aluminum bis (isobutyl acetoacetate) chelate, monoacetylacetonato aluminum bis(2-ethylhexyl acetoacetate) chelate, monoacetylacetonato aluminum bis(dodecyl acetoacetate) chelate, and monoacetylacetonato aluminum bis(oleyl acetoacetate) chelate. One type thereof may be solely used, or two or more types may be used in combination.

The epoxy-based crosslinking agent may preferably be alicyclic epoxy-based compound or aliphatic epoxy-based compound. Examples of the alicyclic epoxy-based compound and the aliphatic epoxy-based compound include 3,4-epoxycyclohexylmethyl, 3,4-epoxycylohexylcarboxylate, 1,3-bis(N,N'-diglycidylaminomethyl)cyclohexane, hydrogenated bisphenol A diglycidyl ether, polyethylene glycol diglycidyl ether, polypropylene glycol diglycidyl ether, 1,6-hexanediol glycidyl ester, adipic acid glycidyl ester, and sebacic acid glycidyl ester. One type thereof may be solely used, or two or more types may be used in combination.

The aziridine-based crosslinking agent may preferably be aliphatic aziridine-based compound. The aliphatic aziridine-based compound is not particularly restricted, but may appropriately be selected from any of chemical compounds known as aliphatic aziridine-based compounds to be used in acrylic pressure-sensitive adhesive. Examples of the aliphatic aziridine-based compound include trimethylolpropane tri(2-methyl-1-aziridinepropionate), tetramethylolmethane-tri-β-aziridinylpropionate, 2,2'-bishydroxymethylbutanol-tris[3-(1-aziridinyl)propionate], and 1,6-hexamethylenediethyleneurea.

In view of properties as the adhesive, the compounding amount of the above crosslinking agent may be selected ordinarily within a range of 0.01 to 5.0 parts by mass relative to 100 parts by mass of the above polymer, preferably within a range of 0.05 to 3.0 parts by mass, and particularly preferably within a range of 0.1 to 1.0 parts by mass.

So long as advantageous effects in the present embodiment is not negatively affected, additives such as tackifier, antioxidizing agent, ultraviolet absorbing agent, light stabilizer, softener, filler and flame retardant may be added as necessary to the adhesive containing mainly the above polymer.

The glass-transition point of the adhesive which constitutes the adhesive layer 12 may be preferably −30° C. or lower, more preferably within a range of −35° C. to −85° C., and most preferably within a range of −40° C. to −80° C. In the case of the recording method where recording light is irradiated to form convex structures of the optical recording layer with deformation into the adhesive layer side, the glass-transition point of the adhesive being within the above range allows recording points to be definitely generated at the interface between the adhesive layer and the optical recording layer, and the obtained multilayer optical recording medium will have excellent recording sensitivity.

The complex modulus at 0° C. of the adhesive which constitutes the adhesive layer 12 may be preferably 10 MPa or less, more preferably within a range of 0.0001 to 10 MPa, further preferably within a range of 0.01 to 5 MPa, and most preferably within a range of 0.1 to 5 MPa. In the case of the recording method where recording light is irradiated to form convex structures of the optical recording layer with deformation into the adhesive layer side, the complex modulus at 0° C. of the adhesive being within the above range allows recording points to be definitely generated at the interface between the adhesive layer and the optical recording layer, and the obtained multilayer optical recording medium will have excellent recording sensitivity. The complex modulus at 0° C. is a value measured according to the method below.

<<Method of Measuring Complex Modulus at 0° C. Of Adhesive>>

Adhesive layers are stacked so that the total thickness of the adhesive layers becomes about 2 mm, and then cut to have a cylindrical shape with a diameter of 8 mm, thus a sample for measurement is prepared. The sample for measurement is subjected to measurement of the complex modulus at a temperature of 0° C. and a frequency of 1 Hz using a dynamic viscoelastic measurement apparatus.

The thickness of the adhesive layer 12 may be preferably within a range of 1 to 50 μm, and particularly preferably within a range of 2 to 40 μm. The thickness of the adhesive layer 12 being within the above range enables to utilize reflected light from the interface between the optical recording layer 11 and the adhesive layer 12 to detect the interface of each layer thereby reading information from the optical recording layer 11.

The refractive index of the adhesive layer 12 may be preferably 1.45 or less, more preferably 1.44 or less, particularly preferably 1.42 or less, and further preferably 1.40 or less. The refractive index of the adhesive layer 12 being within the above range may increase the refractive index difference from that of the optical recording layer 11, and reflected light sufficient for detection can be obtained from the interface between the optical recording layer 11 and the adhesive layer 12. Commonly-used optical recording layer 11 may have a refractive index of about 1.58. The adhesive layer 12 according to the present embodiment may use the previously-described adhesive thereby to achieve the above refractive index. The refractive index as used herein is a value measured using Abbe's refractometer in conformity with JIS K7142 (2008).

The haze value of the adhesive layer 12 may be preferably 1.3% or less, particularly preferably 0.7% or less, and further preferably 0.5% or less. If the haze value is more than 1.3%, then scattering of light is unduly large and the adhesive layer may not be used as the adhesive layer 12 of the multilayer optical recording medium. The haze value as used herein is a value measured using a haze mater in conformity with JIS K7105.

The holding force of the adhesive layer 12 may preferably be within a range such that no displacement occurs after holding of 70,000 seconds. The holding force at 25° C. of the adhesive layer 12 being within the above range ensures that the adhesive force between the adhesive layer 12 and other layers (mainly the optical recording layer 11) may be sufficient. The holding force as used herein is measured as a displacement amount (μ) after 70,000 seconds in conformity with JIS 20237 (2009), wherein a polyethylene terephthalate film is applied to one surface of an adhesive layer (25 mm×25 mm) while a test plate formed of a stainless steel (SUS304) is applied to the other surface, and a weight of 1 kg is attached to the adhesive layer and they are maintained under an environment of 40° C. and 50% RH.

The adhesive which constitutes the above adhesive layer 12 may be used for other usage than the adhesive layer of a multilayer optical recording medium. In particular, it may preferably be used as an adhesive when the refractive index is required to be low, such as 1.45 or less. For example, the above adhesive may be used as resin for optical waveguide, optical adhesive, or resin for adhesion of fluorine-based material, etc.

<Release Sheet>

The release sheets 13 and 13' may be enough if the adhesive layer 12 according to the present embodiment can be released therefrom, and conventionally known ones may be used. For example, resin films such as formed of polyethylene terephthalate and polypropylene, or release sheets obtained by subjecting such resin films to treatment for release using conventionally known release agent (such as silicone-based release agent, long-chain alkyl-based release agent, and alkyd resin-based release agent), may be used.

The release sheets 13 and 13' may preferably be such that the surface roughness (Ra) at the side contacting with the optical recording layer 11 or the adhesive layer 12 is 1 μm or less, in particular 0.5 μm or less, for the purpose of giving smoothness to the optical recording layer 11 or the adhesive layer 12. If the surface roughness (Ra) of the release sheets 13 and 13' exceeds 1 μm, then the surface roughness of the optical recording layer 11 or the adhesive layer 12 also becomes large so that the signal characteristics of the obtained multilayer optical recording medium may possibly be deteriorated. The thickness of the release sheets 13 and 13' may ordinarily be about 20 to 150 μm.

It may be preferred that the release sheets 13 and 13' are configured to have a gap in the release forces. It may also be preferred in this case that the release sheet to be released first is provided as a light-release type and the release sheet to be subsequently released is provided as a heavy-release type. One method for making the gap in the release forces may include having a non-treated resin film as one of the release sheets 13 and 13' and a release sheet as the other.

<Method of Producing Sheet for Producing Multilayer Optical Recording Medium>

The above sheet 1 for producing a multilayer optical recording medium may be produced by the method below, for example. An application agent for optical recording layer may be prepared first which contains a material to constitute the optical recording layer 11 and which may further contain solvent as necessary, while an application agent for adhesive layer 12 may be prepared which contains a material (adhesive) to constitute the adhesive layer 12 and which may further contain solvent as necessary.

The above may be followed by either of: (1) applying the application agent for optical recording layer 11 to the releasable surface of the release sheet 13 to form the optical recording layer 11, thereafter applying thereon the application agent for adhesive layer 12 to form the adhesive layer 12, and laminating thereon another release sheet 13' so that the releasable surface of the release sheet 13' overlaps the surface of the adhesive layer 12; (2) applying the application agent for adhesive layer 12 to the releasable surface of the release sheet 13' to form the adhesive layer 12, thereafter applying thereon the application agent for optical recording layer 11 to form the optical recording layer 11, and laminating thereon another release sheet 13 so that the releasable surface of the release sheet 13 overlaps the surface of the optical recording layer 11; or (3) applying the application agent for optical recording layer 11 to the releasable surface of the release sheet 13 to form the optical recording layer 11 while applying the application agent for adhesive layer 12 to the releasable surface of the release sheet 13' to form the adhesive layer 12, and laminating them so that the optical recording layer 11 and the adhesive layer 12 are overlapped with each other. Applying the application agents may employ an applicator, such as kiss-roll coater, reverse-roll coater, knife coater, knife-over-roll coater, and die coater.

The sheet 1 for producing a multilayer optical recording medium obtained in the above manner may preferably be used as a material for producing the multilayer optical recording medium as will be described later. The sheet 1 for producing a multilayer optical recording medium of which the structure is shown in FIG. 1 is one example, and each of the adhesive layer 12 and the optical recording layer 11 may be provided as a single layer or plural layers.

If necessary, the sheet 1 for producing a multilayer optical recording medium according to the present embodiment may further comprise a transparent resin layer for reinforcing the sheet 1 and/or a positional information added layer that has convexes and concaves on the surface thereof as recording pits and/or grooves for providing the inside of the multilayer optical recording medium with positional information, as well as an optical waveguide layer, a reflective layer, a dielectric layer, and/or other appropriate layers. In this case, the above transparent resin layer may be interposed between the optical recording layer 11 and the adhesive layer 12, or provided on the surface of the adhesive layer 12 opposite to the optical recording layer 11 or on the surface of the optical recording layer 11 opposite to the adhesive layer 12, for example. It may be preferred that the positional information added layer is provided on the outermost layer opposite to the adhesive layer 12 in view of the convenience of forming it.

<Multilayer Optical Recording Medium>

Figure 2:
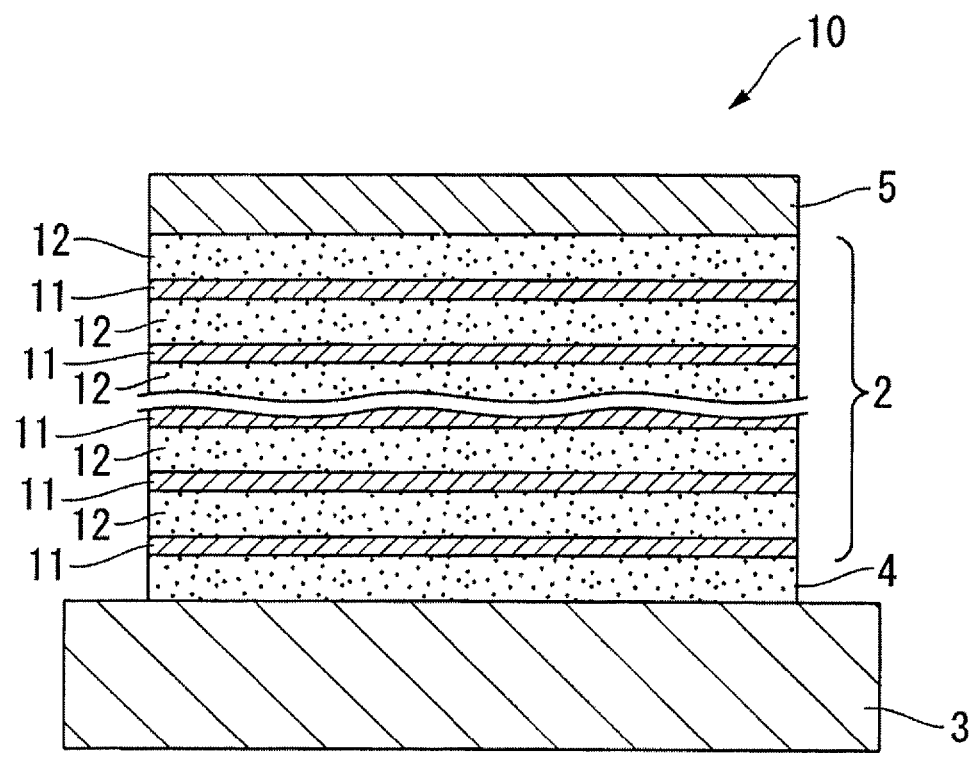
FIG. 2 is a cross-sectional view of a multilayer optical recording medium according to one embodiment of the present invention.

FIG. 2 is a cross-sectional view of a multilayer optical recording medium according to one embodiment of the present invention. The multilayer optical recording medium 10 comprises: a substrate 3; a structure which is provided on the substrate 3 and in which optical recording layers 11 and adhesive layers 12 are laminated on one another (referred hereinafter to as "multilayer structure 2"); and a light transmissive protection film 5 provided on the multilayer structure 2. If necessary, the multilayer optical recording medium 10 according to the present embodiment may further comprise one or more transparent resin layers for reinforcing the optical recording layers and/or a positional information added layer that has convexes and concaves on the surface thereof as recording pits and/or grooves for providing the inside of the multilayer optical recording medium with positional information, as well as an optical waveguide layer, a reflective layer, a dielectric layer, and/or other appropriate layers. In this case, the above one or more transparent resin layers may be each provided on the surface of the optical recording layer 11 opposite to the adhesive layer 12. For the multilayer optical recording medium, a recording method may be employed in which, when recording light is irradiated to the multilayer optical recording medium, convex portions are formed on one or more of the optical recording layers 11 at one or more of interfaces between the optical recording layers 11 and the adhesive layers 12, and corresponding concave portions are formed on one or more of the adhesive layers 12 contacting with portions formed thereon with the convex portions.

The substrate 3 may be formed of a material having excellent optical characteristics and rigidity, such as polymethyl-methacrylate, polycarbonate, polyethylene terephthalate, polyolefin and other synthesized resin, and glass. The thickness of this substrate 3 is not particularly restricted, but may be ordinarily about 0.03 to 2 mm, and preferably 0.05 to 1.5 mm. If the thickness of the substrate 3 is less than 0.03 mm, then handling in the lamination step may be difficult, while if the thickness of the substrate 3 exceeds 2 mm, then the multilayer optical recording medium is likely to be thicker than necessary.

The multilayer structure 2 is a structure in which the optical recording layers 11 and the adhesive layers 12 are laminated on one another, and may preferably be formed using the previously-described sheet 1 for producing a multilayer optical recording medium.

Respective laminated number of the optical recording layers 11 and the adhesive layers 12 in the multilayer structure 2 is not particularly restricted, but the lower limit may be ordinarily 2 or more, and preferably 5 or more. Respective laminated number being one may not be enough for obtaining sufficient recording density. The upper limit may be ordinarily 500 layers or less, and preferably 200 layers or less. Exceeding 500 layers may possibly cause troubles in writing and/or reading of information such as due to absorption of light in each layer and reflection of light from the interfaces.

The thickness of the multilayer structure 2 may be ordinarily about 10 µm to 5 mm, preferably 20 µm to 2 mm, and further preferably 50 µm to 1.2 mm.

As the light transmissive protection film 5, a light transmissive resin film may be used in general. Such a resin film is not particularly restricted, and may appropriately be selected from ones conventionally and commonly used as protection films for optical recording media. The thickness of the light transmissive protection film 5 is not particularly restricted, but may be ordinarily about 3 to 600 µm, and preferably 5 to 150 µm. If the thickness of the light transmissive protection film 5 exceeds 600 µm, then each layer may not be focused, while the thickness of the light transmissive protection film 5 is less than 3 µm, then sufficient protection may be difficult.

One example of the method for producing the above multilayer optical recording medium 10 will be described.

The substrate 3 is prepared first, and an adhesive layer 4 is formed thereon. Material of this adhesive layer 4 may be or may not be the same as the adhesive which constitutes the above adhesive layer 12.

The release sheet 13 is released from the sheet 1 for producing a multilayer optical recording medium, and the exposed optical recording layer 11 and the adhesive layer 4 on the substrate 3 are bonded so that they face each other. The release sheet 13' is then released from this laminated body to expose the adhesive layer 12, and this adhesive layer 12 and the optical recording layer 11, which has been exposed by releasing the release sheet 13 from another sheet 1 for producing a multilayer optical recording medium, are bonded so that they face each other. The lamination may be sequentially repeated in a similar procedure, and the multilayer structure 2 can thus be obtained in which plural optical recording layers 11 and plural adhesive layers 12 are laminated on one another.

Finally, the light transmissive protection film 5 may be applied to the adhesive layer 12, which has been exposed by releasing the release sheet 13' as the uppermost layer, and the multilayer optical recording medium 10 may thereby be obtained.

In another example of the method for producing the above multilayer optical recording medium 10, the substrate 3 is prepared, the release sheet 13' is released from the sheet 1 for producing a multilayer optical recording medium, and the exposed adhesive layer 12 and the surface of the substrate 3 are bonded so that they face each other. The release sheet 13 is then released from this laminated body to expose the optical recording layer 11, and this optical recording layer 11 and the adhesive layer 12, which has been exposed by releasing the release sheet 13' from another sheet 1 for producing a multilayer optical recording medium, are bonded so that they face each other. The lamination may be sequentially repeated in a similar procedure, and the multilayer structure 2 can thus be obtained in which plural adhesive layers 12 and plural optical recording layers 11 are laminated on one another. Finally, the light transmissive protection film may be applied to the optical recording layer 11, which has been exposed by releasing the release sheet 13 as the uppermost layer, and the multilayer optical recording medium 10 may thereby be obtained.

The multilayer optical recording medium 10 according to the present may use the previously-described adhesive layer 12 thereby to result in an advantageous effect that the reflected light having sufficient intensity necessary for detection can be obtained from the interface between the optical recording layer 11 and the adhesive layer 12. Moreover, the adhesive layer 12 may generate less scattered light thereby to cause less noise, so that failure in detecting the reflected light can thus be suppressed from occurring.

The multilayer optical recording medium 10 may also be produced without using the sheet 1 for producing a multilayer optical recording medium. For example, the multilayer optical recording medium 10 may be produced by applying the application agent for adhesive layer 12 on a certain base material or substrate 3 to form the adhesive layer 12 and repeating the steps of: applying the application agent for optical recording layer 11 on the adhesive layer 12 to form the optical recording layer 11; and further applying the application agent for adhesive layer 12 on the optical recording layer 11 to form the adhesive layer 12. In an alternative embodiment, the multilayer optical recording medium 10 may be produced by previously forming optical recording layers 11 on release sheets and applying the application agent for adhesive layer 12 on a certain base material or substrate 3, and repeating the steps of: laminating one of the above optical recording layers 11 on the adhesive layer 12 and releasing the release sheet; and further applying the application agent for adhesive layer 12 on the optical recording layer 11 to form the adhesive layer 12.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention.

EXAMPLES

The present invention will hereinafter be further specifically described with reference to examples etc, but the scope of the present invention is not limited to these examples etc.

Examples 1-20 and Comparative Examples 1-5

(1) Formation of Optical Recording Layer

Ten parts by mass of 1,1-bis-[4-[N,N-di(p-tolyl)amino]phenyl]cyclohexane (available from Tokyo Chemical Industry Co., Ltd.) as the photon absorption material and 90 parts by mass of toluene as the solvent were mixed to prepare a first solution having a solid content concentration of 10 mass %. Ten parts by mass of polystyrene (F-80 available from TOSOH CORPORATION) as the matrix and 90 parts by mass of toluene as the solvent were mixed to prepare a second solution having a solid content concentration of 10 mass %. The above first solution and the above second solution were mixed with a mass ratio of 7:3 to provide an application liquid for optical recording layer.

To the release layer surface of the release sheet comprising a polyethylene terephthalate film base material of a thickness of 38 μm with release treatment with an alkyd resin-based release agent, the above application liquid for optical recording layer was applied using gravure-coating method, and dried at 110° C. for one minute to form an optical recording layer having a thickness of about 1 μm, then to give optical recording layer with release sheet.

(2) Formation of Adhesive Layer

Fluorine-containing monomer and/or silicon-containing monomer as shown in Table 1, acrylic monomer having a functional group, and (meth)acrylic acid ester were mixed in a compounding ratio (composition) as shown in Table 1, 0.25 parts by mass of azobisisobutyronitrile (polymerization starter) was added to the mixture, then reacted in ethyl acetate to obtain ethyl acetate solution (solid content concentration: 20 mass %) of acrylic acid ester copolymer (Mw 200,000). Then the crosslinking agent shown in Table 1 was added to prepare application liquid for adhesive layer.

To the release layer surface of the release sheet comprising a polyethylene terephthalate film base material of a thickness of 38 μm with release treatment on one surface with an alkyd resin-based release agent, the above application liquid for optical recording layer was applied using knife-coating method, and dried at 90° C. for one minute to form an adhesive layer having a thickness of about 10 μm, then to give adhesive layer with release sheet.

Symbols shown in Table 1 are as below.
<<Polymer Composition>>
V-8F: 1H,1H,5H-octafluoropentylacrylate (product name "V-8F" available from Osaka Organic Chemical Industry Ltd.)
V-4F: 2,2,3,3-tetrafluoropropylacrylate (product name "V-4F" available from Osaka Organic Chemical Industry Ltd.)
V-13F: 3,3,4,4,5,5,6,6,7,7,8,8,8-tridecafluorooctylcrylate (product name "V-13F" available from Osaka Organic Chemical Industry Ltd.)

M-3F: 2,2,2-trifluoroethylmethacrylate (product name "M-3F" available from Kyoeisha Chemical Co., Ltd.)

TM-0701T: 3-[tris(trimethylsilyloxy)silyl]propylmethacrylate (product name "TM-0701T" available from JNC CORPORATION)

BA: butyl acrylate

2EHA: 2-ethylhexylacrylate

HEA: 2-hydroxyethylacrylate

HOA-MS (N): 2-acryloyloxyethyl-succinic acid

AAc: acrylic acid

<<Crosslinking Agent>>

M5A: aluminum chelate-based crosslinking agent (product name "M-5A" available from Soken Chemical & Engineering Co., Ltd.)

BXX5172: aziridine-based crosslinking agent (product name "BXX5172" available from Soken Chemical & Engineering Co., Ltd.)

8515: isocyanate-based crosslinking agent (product name "BHS-8515" available from TOYO INK CO., LTD.)

CORONATE HL: isocyanate-based crosslinking agent (product name "CORONATE HL" available from Nippon Polyurethane Industry Co., Ltd.)

TC-5: epoxy-based crosslinking agent (product name "TC-5" available from MITSUBISHI GAS CHEMICAL COMPANY, INC.)

(3) Production of Sheet for Producing Multilayer Optical Recording Medium

The surface at the adhesive layer side of the adhesive layer with release sheet obtained in the above (2) and the surface at the optical recording layer side of the optical recording layer with release sheet obtained in the above (1) were faced, and passed through between two rubber rolls at room temperature to adhere to each other by pressure, then to give a multilayer optical recording medium comprising a laminate of optical recording layer and adhesive layer. This sheet for producing a multilayer optical recording medium has a structure of release sheet/optical recording layer (1 μm)/adhesive layer (10 μm)/release sheet.

(4) Production of Multilayer Optical Recording Medium

The release sheet at the adhesive layer side of the sheet for producing a multilayer optical recording medium prepared in the above (3) was released therefrom, the exposed adhesive layer was overlapped with a polycarbonate sheet (thickness: 75 μm) as a light transmissive protection film, and they were caused to pass through between two rubber rolls at room temperature to adhere to each other by pressure, thereby laminating the adhesive sheet and the light transmissive protection film, followed by releasing the release sheet therefrom to expose the optical recording layer to give a laminate A.

The surface at the adhesive layer side of the adhesive layer with release sheet obtained in the above (2) and a mirror surface polycarbonate substrate (thickness: 1.1 mm) were overlapped and passed through between two rubber rolls at room temperature to adhere to each other by pressure, thereby laminating the adhesive layer and the mirror surface polycarbonate substrate, followed by releasing the release sheet therefrom to expose the adhesive layer to give a laminate B.

The exposed optical recording layer of the laminated body A and the exposed adhesive layer of the laminated body B were overlapped and passed through between two rubber rolls at room temperature to adhere to each other by pressure to prepare a multilayer optical recording medium. The obtained multilayer optical recording medium has a structure of polycarbonate sheet (75 μm)/adhesive (10 μm)/optical recording layer/adhesive (10 μm)/mirror surface polycarbonate substrate (1.1 mm).

<Exemplary Test 1> (Measurement of Refractive Index)

The refractive index of the adhesive layer (thickness: 10 μm) formed in the above (2) was measured at a measurement wavelength of 589 nm using Abbe's refractometer (available from ATAGO CO., LTD.) in conformity with JIS K7142 (2008). Results are listed in Table 1.

<Exemplary Test 2> (Measurement of Holding Force)

One surface of the adhesive layer (25 mm×25 mm) formed in the above (2) was applied to a polyethylene terephthalate film (product name: COSMOSHINE A4100, thickness: 50 μm, available from Toyobo Co., Ltd.), the release sheet was released from the opposite surface of the above adhesive layer, and the exposed adhesive layer was adhered by pressure to a test plate formed of stainless steel (SUS304). A weight of 1 kg was attached to the adhesive layer, and a displacement amount (μm) of the weight after 70,000 seconds under an environment of 40° C. and 50% RH was measured in accordance with of JIS 20237 (2009). Results are listed in Table 1. Criteria are such that "Good" represents the case of the weight not dropping off after 70,000 seconds while "Bad" represents the case of dropping off within 70,000 seconds.

<Exemplary Test 3> (Measurement of Size of Domain)

For the adhesive layer formed in the above (2), a scanning probe microscope (SPM; SPA 300HV available from SII Nano Technology Inc.) was used to observe a phase image with the dynamic force mode (DFM), and a size of domain (nm) was measured. Specifically, 30 domains were randomly extracted from the observed phase image to measure respective maximum lengths, and the average value thereof was to be the size of domain. Results are listed in Table 1.

Figure 3:
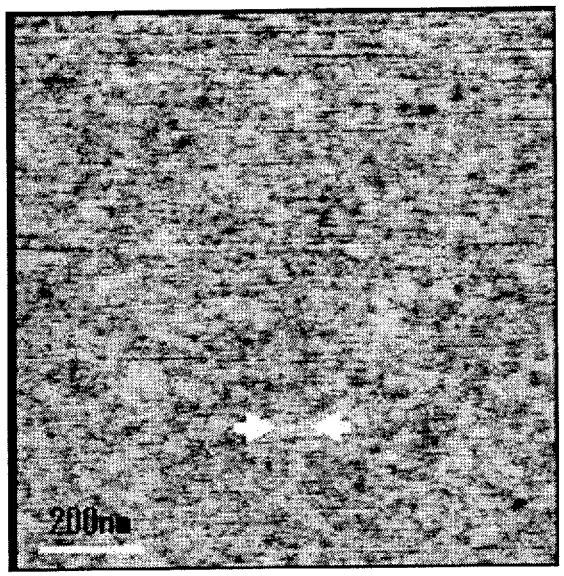
FIG. 3 is a photograph of a DFM phase image by SPM of an adhesive layer in Example 3.
Figure 4:
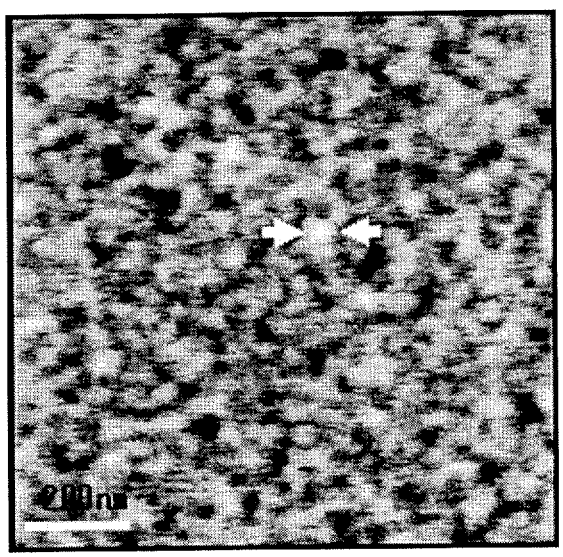
FIG. 4 is a photograph of a DFM phase image by SPM of an adhesive layer in Example 14.
Figure 5:
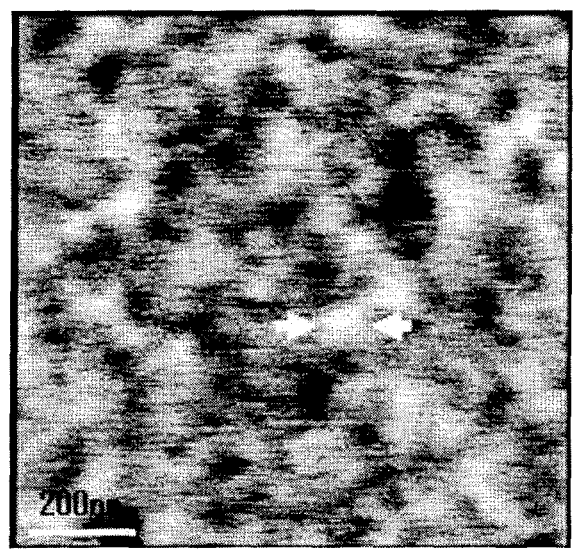
FIG. 5 is a photograph of a DFM phase image by SPM of an adhesive layer in Comparative Example 4.

FIG. 3 is a photograph of a DFM phase image by SPM of the adhesive layer in Example 3, FIG. 4 is a photograph of a DFM phase image by SPM of the adhesive layer in Example 14, and FIG. 5 is a photograph of a DFM phase image by SPM of the adhesive layer in Comparative Example 4.

<Exemplary Test 4> (Measurement of Haze Value)

Polyethylene terephthalate films (PET50A-4100 available from Toyobo Co., Ltd.) were applied to both surfaces of the adhesive layer formed in the above (2). This laminated body was subjected to incident light, and the haze value was measured using a haze meter (NDH2000 available from NIPPON DENSHOKU INDUSTRIES CO., LTD.) in conformity with JIS K7105. Results are listed in Table 1.

<Exemplary Test 5> (Measurement of Noise Level)

For the multilayer optical recording medium prepared in the above (4), a disc tester (BDT-SDX available from EXPERT MAGNETICS CORP.) was used to perform a test at a wavelength of 405 nm, and RF signals were detected using a spectrum analyzer (GSP-930 available from Instek Japan Corporation). Determination was performed with criteria that the signal intensity at 2 MHz being −77 dBm or less represents the noise level classified as "A" (very good), −77 dBm or more and −74 dBm or less as "B" (good), and −74 dBm or more as "C" (bad). Results are listed in Table 1.

<Exemplary Test 6> (Measurement of Grass-Transition Point)

The grass-transition point (Tg; ° C.) of the adhesive constituting the adhesive layer was measured with a rate of temperature increase/decrease of 20° C./min. within a range of −70° C. to 40° C. using a differential scanning calorimeter (trade name "DSC Q2000" available from TA Instruments Japan Inc.). Results are listed in Table 1.

<Exemplary Test 7> (Measurement of Complex Modulus)

After releasing the release sheets from the adhesive layers with release sheets obtained in the above (2), the adhesive layers were applied in the total thickness of about 2 mm, and then cut to have a cylindrical shape with a diameter of 8 mm, then to give a sample for measurement. The sample for measurement was subjected to measurement of the complex modulus (MPa) at a temperature of 0° C. and a frequency of 1 Hz using a dynamic viscoelastic measurement apparatus (model name "DYNAMIC ANALYZER RDA-II" available from Rheometrics, Inc.). Results are listed in Table 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Copolymer composition (parts by mass) | V-8F | — | — | — | 25 | 23 | 35 | 45 | 45 | 50 |
|  | V-4F | — | — | — | — | — | — | — | — | — |
|  | V-13F | 11 | 15 | 20 | — | — | — | — | — | — |
|  | M-3F | — | — | — | — | 5 | — | — | — | — |
|  | TM-0701T | — | — | — | — | — | — | — | — | — |
|  | BA | 88 | 84 | 79 | 73 | 71 | 64 | 24 | 45 | 20 |
|  | 2EHA | — | — | — | — | — | — | 25 | — | 28 |
|  | HEA | — | — | — | — | — | — | 5 | — | — |
|  | HOA-MS(N) | — | — | — | 1 | 1 | 1 | 1 | — | — |
|  | AAc | 1 | 1 | 1 | 1 | — | — | — | 10 | 2 |
| Crosslinking agent (parts by mass) | M-5A | 1 | 1 | 1 | 1 | 1 | 1 | 1 | 1 | 1 |
|  | BXX5172 | — | 0.01 | — | 0.01 | 0.01 | — | — | — | — |
|  | 8515 | — | — | — | — | — | — | — | — | — |
|  | CORONATE HL | — | — | — | — | — | — | — | — | — |
|  | TC-5 | — | — | — | — | — | 1 | — | — | — |
| Refractive index |  | 1.45 | 1.45 | 1.44 | 1.44 | 1.43 | 1.43 | 1.42 | 1.42 | 1.42 |
| Holding force (sec) |  | Good | Good | Good | Good | Good | Good | Good | Good | Good |
| Haze value |  | 0.5 | 0.3 | 0.4 | 0.4 | 0.4 | 0.5 | 0.5 | 0.5 | 0.4 |
| Size of domain (nm) |  | 50 | 50 | 50 | 50 | 50 | 50 | 80 | 80 | 100 |
| Evaluation of noise level |  | A | A | A | A | A | A | B | B | B |
| Grass-transition point (° C.) of adhesive |  | −53 | −52 | −50 | −49 | −49 | −46 | −45 | −43 | −45 |
| Complex modulus (MPa) at 0° C. of adhesive |  | 0.09 | 0.1 | 0.1 | 0.2 | 0.2 | 0.2 | 0.2 | 0.3 | 0.3 |

|  |  | Example 10 | Example 11 | Example 12 | Example 13 | Example 14 | Example 15 | Example 16 | Example 17 | Example 18 |
|---|---|---|---|---|---|---|---|---|---|---|
| Copolymer composition (parts by mass) | V-8F | — | 55 | 55 | 60 | — | 80 | 90 | 60 | — |
|  | V-4F | 50 | — | — | — | 65 | — | — | 35 | — |
|  | V-13F | — | — | — | — | — | — | — | — | — |
|  | M-3F | — | — | — | — | — | — | — | — | — |
|  | TM-0701T | — | — | — | — | — | — | — | — | 99 |
|  | BA | 48 | 33 | 35 | 15 | 33 | 0 | 0 | 0 | 0 |
|  | 2EHA | — | 10 | — | 23 | — | 15 | 7 | — | — |
|  | HEA | 2 | 2 | — | — | 2 | — | — | — | — |
|  | HOA-MS(N) | — | — | — | — | — | — | — | — | 1 |
|  | AAc | — | — | 10 | 2 | — | 5 | 3 | 5 | — |
| Crosslinking agent (parts by mass) | M-5A | — | 1 | 1 | 1 | — | 1 | 1 | 1 | 1 |
|  | BXX5172 | — | — | — | — | 0.02 | — | — | — | — |
|  | 8515 | 0.1 | — | — | — | — | — | — | — | — |
|  | CORONATE HL | 0.01 | — | — | — | 0.02 | 0.11 | — | — | — |
|  | TC-5 | 1 | — | — | — | — | 1 | — | — | — |
| Refractive index |  | 1.42 | 1.42 | 1.42 | 1.41 | 1.42 | 1.39 | 1.39 | 1.38 | 1.38 |
| Holding force (sec) |  | Good | Good | Good | Good | Good | Good | Good | Good | Good |
| Haze value |  | 0.3 | 0.4 | 0.5 | 0.4 | 0.3 | 0.4 | 0.3 | 0.3 | 0.4 |
| Size of domain (nm) |  | 100 | 100 | 100 | 100 | 100 | 50 | 40 | 20 | 40 |
| Evaluation of noise level |  | B | B | B | B | B | A | A | A | A |
| Grass-transition point (° C.) of adhesive |  | −35 | −43 | −41 | −42 | −32 | −37 | −35 | −30 | −60 |
| Complex modulus (MPa) at 0° C. of adhesive |  | 0.6 | 0.3 | 0.4 | 0.4 | 0.8 | 0.8 | 0.9 | 0.8 | 0.3 |

|  |  | Example 19 | Example 20 | Comparative Example 1 | Comparative Example 2 | Comparative Example 3 | Comparative Example 4 | Comparative Example 5 |
|---|---|---|---|---|---|---|---|---|
| Copolymer composition (parts by mass) | V-8F | 97 | 99 | — | — | 5 | — | — |
|  | V-4F | — | — | — | — | — | — | — |
|  | V-13F | — | — | — | — | — | — | — |
|  | M-3F | — | — | — | — | — | 40 | 40 |
|  | TM-0701T | — | — | — | — | — | — | — |
|  | BA | 0 | 0 | 92 | 45 | 90 | 55 | 55 |
|  | 2EHA | — | — | — | 50 | — | — | — |
|  | HEA | — | — | — | 5 | 5 | 5 | 5 |
|  | HOA-MS(N) | — | 1 | — | — | — | — | — |
|  | AAc | 3 | — | 8 | — | — | — | — |

TABLE 1-continued

| | | | | | | | | |
|---|---|---|---|---|---|---|---|---|
| Crosslinking agent (parts by mass) | M-5A | 1 | — | 1 | — | — | — | — |
| | BXX5172 | — | — | — | — | — | — | — |
| | 8515 | — | 0.1 | — | 1 | 1 | 1 | — |
| | CORONATE HL | — | — | — | — | — | — | — |
| | TC-5 | — | 1 | 1 | — | — | — | — |
| Refractive index | | 1.38 | 1.38 | 1.46 | 1.46 | 1.46 | 1.43 | 1.43 |
| Holding force (sec) | | Good | Good | Good | Good | Good | Good | Bad |
| Haze value | | 0.4 | 0.3 | 0.5 | 0.3 | 0.3 | 0.4 | 0.4 |
| Size of domain (nm) | | 30 | 20 | 30 | 30 | 30 | 150 | 120 |
| Evaluation of noise level | | A | A | Not evaluable | Not evaluable | Not evaluable | C | C |
| Grass-transition point (° C.) of adhesive | | −32 | −33 | −40 | −50 | −50 | −20 | −20 |
| Complex modulus (MPa) at 0° C. of adhesive | | 1.6 | 1.5 | 0.11 | 0.1 | 0.09 | 70 | 70 |

As apparent from Table 1, each of the adhesive layers obtained in the examples was such that the haze was low, the refractive index was low such as being 1.45 or less, and the size of domain was 110 nm or less, and hence the intensity of the reflected light from the interface between the adhesive layer and the optical recording layer was strong to cause less noise. In contrast, each of the adhesive layers in Comparative Examples 1 to 3 was such that the haze was low, but the refractive index was unduly high, and hence the intensity of the reflected light from the interface between the adhesive layer and the optical recording layer was week, so that RF signals were not able to be detected. Each of the adhesive layers in Comparative Examples 4 and 5 was such that the haze and the refractive index were low, but the size of domain was unduly large, so that the scattered light in the adhesive layer 12 and at the interface was increased, and sufficient RF signal intensity was not obtained, thus resulting in increased noise.

INDUSTRIAL APPLICABILITY

The present invention is useful as a multilayer optical recording medium that utilizes reflected light from the interface between the optical recording layer and the adhesive layer to detect the interface of each layer.

EXPLANATION OF NUMERAL REFERENCES

1 . . . Sheet for producing multilayer optical recording medium
11 . . . Optical recording layer
12 . . . Adhesive layer
13, 13' . . . Release sheet
2 . . . Multilayer structure
3 . . . Substrate
4 . . . Adhesive layer
5 . . . Light transmissive protection film
10 . . . Multilayer optical recording medium

The invention claimed is:

1. A multilayer optical recording medium obtained using a sheet for producing a multilayer optical recording medium comprising optical recording layers and adhesive layers laminated on one another, wherein
the sheet comprises an optical recording layer and an adhesive layer laminated on each other,
the adhesive layer comprises an adhesive comprising a polymer as a main component, the polymer includes flourine-containing monomer and/or silicon-containing monomer as a constituent monomer component, and the adhesive layer has no domain structure or has a domain structure with a size of domain of 110 nm or less,
a total content of the fluorine-containing monomer and the silicon-containing monomer is 10 to 100 mass % when a monomer total amount as the constituent monomer component in the polymer is 100 mass %, and
a convex portion is formed on any of the optical recording layers at an interface between the optical recording layers and the adhesive layers, and a concave portion is formed on the adhesive layer contacting with a portion formed thereon with the convex portion when recording light is irradiated to the multilayer optical recording medium.

2. A multilayer optical recording medium comprising optical recording layers and adhesive layers laminated on one another, wherein
the adhesive layers comprise an adhesive comprising a polymer as a main component, the polymer includes flourine-containing monomer and/or silicon-containing monomer as a constituent monomer component, the adhesive layers have no domain structure of have domain structure with a size of domain of 110 nm or less,
a total content of the fluorine-containing monomer and the silicon-containing monomer is 10 to 100 mass % when a monomer total amount as the constituent monomer component in the polymer is 100 mass %, and
a convex portion is formed on any of the optical recording layers at an interface between the optical recording layers and the adhesive layers, and a concave portion is formed on the adhesive layer contacting with a portion formed thereon with the convex portion when recording light is irradiated to the multilayer optical recording medium.

3. The multilayer optical recording medium as recited in claim 1, wherein the fluorine-containing monomer is fluorine-containing acrylic monomer, and the silicon-containing monomer is silicon-containing acrylic monomer.

4. The multilayer optical recording medium as recited in claim 1, wherein the polymer contains, as the constituent monomer component, acrylic monomer having a functional group.

5. The multilayer optical recording medium as recited in claim 1, wherein the polymer is crosslinked by a crosslinking agent.

6. The multilayer optical recording medium as recited in claim 5, wherein the crosslinking agent is at least one member selected from a group consisting of metal-based crosslinking agent, epoxy-based crosslinking agent, and aziridine-based crosslinking agent.

7. The multilayer optical recording medium as recited in claim 1, wherein the adhesive layer has a refractive index of 1.45 or less.

8. The multilayer optical recording medium as recited in claim 1, wherein the optical recording layer contains a photon absorption material.

9. The multilayer optical recording medium as recited in claim 2, wherein the fluorine-containing monomer is fluorine-containing acrylic monomer, and the silicon-containing monomer is silicon-containing acrylic monomer.

10. The multilayer optical recording medium as recited in claim 2, wherein the polymer contains, as the constituent monomer component, acrylic monomer having a functional group.

11. The multilayer optical recording medium as recited in claim 2, wherein the polymer is crosslinked by a crosslinking agent.

12. The multilayer optical recording medium as recited in claim 11, wherein the crosslinking agent is at least one type selected from a group consisting of metal-based crosslinking agent, epoxy-based crosslinking agent, and aziridine-based crosslinking agent.

13. The multilayer optical recording medium as recited in claim 2, wherein the adhesive layer has a refractive index of 1.45 or less.

14. The multilayer optical recording medium as recited in claim 2, wherein the optical recording layer contains a photon absorption material.

* * * * *